(12) United States Patent
Zheng et al.

(10) Patent No.: US 12,155,243 B2
(45) Date of Patent: Nov. 26, 2024

(54) BATTERY CONTROL METHOD AND APPARATUS TO CONTROL A CURRENT THAT PASSES THROUGH A BATTERY

(71) Applicant: Huawei Technologies Co., Ltd., Shenzhen (CN)

(72) Inventors: Lulu Zheng, Shanghai (CN); Rui Yang, Shanghai (CN); Shifei Yuan, Shanghai (CN); Zhiwei Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 992 days.

(21) Appl. No.: 17/010,067

(22) Filed: Sep. 2, 2020

(65) Prior Publication Data

US 2020/0403430 A1    Dec. 24, 2020

Related U.S. Application Data

(63) Continuation of application No. PCT/CN2019/081659, filed on Apr. 8, 2019.

(30) Foreign Application Priority Data

Jun. 22, 2018    (CN) .......................... 201810653496.0

(51) Int. Cl.
*H02J 7/00* (2006.01)
*H01M 10/42* (2006.01)
(Continued)

(52) U.S. Cl.
CPC ..... *H02J 7/00302* (2020.01); *H01M 10/4207* (2013.01); *H01M 10/425* (2013.01);
(Continued)

(58) Field of Classification Search
CPC .................................................. H02J 7/00302
(Continued)

(56) References Cited

U.S. PATENT DOCUMENTS

2013/0046200 A1\* 2/2013 Stauber ............. A61B 10/0233
600/567
2013/0314095 A1    11/2013 Nakashima et al.
(Continued)

FOREIGN PATENT DOCUMENTS

CN    101471460 A    7/2009
CN    103199583 A    7/2013
(Continued)

OTHER PUBLICATIONS

Wang, L., et al., "Battery pack topology structure on state-of-charge estimation accuracy in electric vehicles," Electrochimica Acta 219, 2016, 711-720, 10 pages.
(Continued)

*Primary Examiner* — Yalkew Fantu
(74) *Attorney, Agent, or Firm* — Conley Rose, P.C.

(57) ABSTRACT

A battery control method comprising detecting whether a current value of N battery systems is greater than a safe current, where the safe current is a safe current of a target battery system, and the target battery system has a largest resistance difference of parallel branch circuits respectively corresponding to M battery cells in the target battery system, and adjusting the current value of the N battery systems when the current value of the N battery systems is greater than the safe current.

20 Claims, 7 Drawing Sheets

(51) Int. Cl.
*H01M 10/44* (2006.01)
*H01M 10/48* (2006.01)

(52) U.S. Cl.
CPC ....... *H01M 10/441* (2013.01); *H01M 10/482* (2013.01); *H02J 7/0013* (2013.01); *H02J 7/00306* (2020.01); *H02J 7/0048* (2020.01); *H02J 7/00714* (2020.01); *H01M 2010/4271* (2013.01)

(58) Field of Classification Search
USPC .......................................................... 320/126
See application file for complete search history.

(56) References Cited

U.S. PATENT DOCUMENTS

| | | | |
|---|---|---|---|
| 2014/0021925 A1 | 1/2014 | Asakura et al. | |
| 2014/0067344 A1 | 3/2014 | Kawai et al. | |
| 2014/0354232 A1 | 12/2014 | Carcouet et al. | |
| 2015/0035495 A1* | 2/2015 | Yoshida | H01M 10/486 320/134 |
| 2016/0046200 A1 | 2/2016 | Timmons et al. | |
| 2016/0061908 A1* | 3/2016 | Torai | G01R 31/3648 702/63 |
| 2016/0211680 A1 | 7/2016 | Ganor | |
| 2016/0241055 A1 | 8/2016 | Li et al. | |
| 2016/0351976 A1* | 12/2016 | Kawahara | B60K 6/28 |
| 2017/0069900 A1 | 3/2017 | Casebolt et al. | |
| 2019/0081369 A1* | 3/2019 | Monden | H02J 7/00 |

FOREIGN PATENT DOCUMENTS

| | | |
|---|---|---|
| CN | 103323775 A | 9/2013 |
| CN | 104122447 A | 10/2014 |
| CN | 106019160 A | 10/2016 |
| CN | 106654424 A | 5/2017 |
| CN | 106786893 A | 5/2017 |
| CN | 107808984 A | 3/2018 |
| DE | 102012107995 A1 | 3/2014 |
| EP | 2816702 B1 | 5/2021 |
| JP | 2011024303 A | 2/2011 |
| JP | 2011135628 A | 7/2011 |
| JP | 2014187807 A | 10/2014 |
| RU | 2551182 C2 | 5/2015 |
| WO | 2014153947 A1 | 10/2014 |
| WO | 2017154112 A1 | 9/2017 |

OTHER PUBLICATIONS

Kutong, Q., et al., "Design of centralized battery management system for electrical vehicle," Journal of Electronic Measurement and Instrumentation, vol. 29, No. 7, Jul. 2015, with an English abstract, 9 pages.

Brand, M., et al., "Current distribution within parallel-connected battery cells," Journal of Power Sources vol. 334, Dec. 1, 2016, pp. 202-212.

Gong, X., et al., "Study of the Characteristics of Battery Packs in Eectric Vehicles with Parallel-Connected Lithium-Ion Battery Cells," (Michigan—IEEE—2015) IEEE Transactions on Industry Applications, vol. 51, No. 2, Mar./Apr. 2015, 8 pages.

* cited by examiner

BATTERY CONTROL METHOD AND APPARATUS TO CONTROL A CURRENT THAT PASSES THROUGH A BATTERY

CROSS-REFERENCE TO RELATED APPLICATIONS

This application is a continuation of International Patent Application No. PCT/CN2019/081659 filed on Apr. 8, 2019, which claims priority to Chinese Patent Application No. 201810653496.0 filed on Jun. 22, 2018. The disclosures of the aforementioned applications are hereby incorporated by reference in their entireties.

TECHNICAL FIELD

Embodiments of this application relate to the field of battery technologies, and in particular, to a battery control method and a battery control apparatus.

BACKGROUND

With continuous development of battery technologies, a requirement for a battery endurance capability is continuously increased, and a corresponding battery capacity is also continuously increased.

Because a capacity of a single battery cell is limited, an existing battery is formed by connecting a plurality of battery cells. A common connection manner is first connecting a plurality of battery cells with a same capacity and a same internal resistance in parallel to form a parallel module, and then connecting a plurality of parallel modules in series to form a battery.

However, in a process of configuring and using a battery string, a capacity and an internal resistance of a battery cell in the battery are affected by factors such as a manufacturing process, processing, a use environment, and self-discharging, and consequently the capacities or the internal resistances of the battery cells are inconsistent.

When the capacities or the internal resistances of the battery cells are inconsistent, when the battery is being charged or discharged, current distribution of the battery is uneven. For example, in a fast charging scenario, a branch current of a parallel branch circuit corresponding to a battery cell that has a smaller internal resistance in a parallel module is excessively large, and when the branch current is greater than a limiting value of the battery cell, the battery is overcharged, and consequently an available lifespan and safety performance of the battery are reduced.

SUMMARY

Embodiments of this application provide a battery control method and a battery control apparatus, to control a current that passes through a battery to be less than or equal to a safe current corresponding to a battery module that has a largest resistance difference of parallel branch circuits respectively corresponding to battery cells in a same battery module such that a charging current or a discharging current of each battery cell in the battery module is within a safe current range. This improves safety performance and a lifespan of the battery.

According to a first aspect of the embodiments of this application, a battery control method is provided. The battery includes N battery modules, the N battery modules are connected in series, each of the N battery modules includes M battery cells, and the M battery cells are connected in parallel, where N is an integer greater than or equal to 1, and M is an integer greater than 1. The method includes in a charging or discharging process of the battery, detecting, by a battery control apparatus, whether current value that pass through the N battery modules is greater than a safe current, where the safe current is a safe current of a target battery module, and the target battery module is a battery module that has a largest resistance difference of parallel branch circuits respectively corresponding to the M battery cells in a same battery module, where the target battery module is included in the N battery modules, and when a current value of a current that passes through at least one of the N battery modules is greater than the safe current, adjusting, by the battery control apparatus, the current that pass through the N battery modules such that the current value of the current that pass through the N battery modules each is equal to or less than the safe current.

It can be learned from the first aspect that the battery control apparatus controls the current that passes through the battery to be less than or equal to the safe current corresponding to the battery module that has the largest resistance difference of the parallel branch circuits respectively corresponding to battery cells in the same battery module such that a charging current or a discharging current of each battery cell in the battery module is within a safe current range. This improves safety performance and a lifespan of the battery.

Based on the first aspect of the embodiments of this application, in a first implementation of the first aspect of the embodiments of this application, before detecting whether current value that pass through the N battery modules is greater than a safe current, the method further includes obtaining, by the battery control apparatus, a resistance value of a first resistor and resistance values of second resistors, where the first resistor is a total resistor of the target battery module, and the second resistors are resistors of the parallel branch circuits respectively corresponding to the M battery cells in the target battery module, and then determining, based on the resistance value of the first resistor and the resistance values of the second resistors, the safe current corresponding to the target battery module. It can be learned from the first implementation of the first aspect that the battery control apparatus may determine, based on the first resistor and the second resistors, the safe current of the battery module that has the largest resistance difference of the parallel branch circuits corresponding to the battery cells in the same battery module. This provides a specific implementation of determining the safe current.

Based on the first aspect and the first implementation of the first aspect of the embodiments of this application, in a second implementation of the first aspect of the embodiments of this application, when the safe current is a safe charging current, obtaining, by the battery control apparatus, a resistance value of a first resistor includes in a charging process of the battery, obtaining, by the battery control apparatus, at least one group of first charging parameters, where the at least one group of first charging parameters are charging parameters collected at different moments when a charging current is not zero, each of the at least one group of first charging parameters include first terminal voltages, first currents, first temperatures, and first battery state of charges (SOCs) that are respectively corresponding to the N battery modules, and the first SOCs are SOCs respectively corresponding to the N battery modules when the group of first charging parameters are obtained, where the SOC is a ratio of a remaining capacity of the battery cell to a saturated capacity of the battery cell, determining, by the battery control apparatus based on the at least one group of first charging parameters, resistance values respectively corresponding to the N battery modules, and then determining, from the resistance values respectively corresponding to the N battery modules, that a resistance value corresponding to the target battery module is the resistance value of the first resistor. It can be learned from the second implementation of the first aspect that, in the charging process of the battery, the battery control apparatus obtains the at least one group of first charging parameters whose charging currents are not zero, and determines the resistance value of the first resistor based on the first charging parameter. This improves accuracy of the resistance value of the first resistor.

Based on any one of the first aspect and the first implementation of the first aspect and the second implementation of the first aspect of the embodiments of this application, in a third implementation of the first aspect of the embodiments of this application, before determining, from the resistance values respectively corresponding to the N battery modules, that a resistance value corresponding to the target battery module is the resistance value of the first resistor, the method further includes in a charging process of the battery, controlling, by the battery control apparatus, a charging current of the battery to be zero, and then obtaining at least one group of second charging parameters, where the at least one group of second charging parameters are charging parameters collected at different moments when the charging current is zero, each of the at least one group of second charging parameters include second terminal voltages, second currents, second temperatures, and second SOCs that are respectively corresponding to the N battery modules, and the second SOCs are SOCs respectively corresponding to the N battery modules when the group of second charging parameters are obtained, and determining the target battery module based on the at least one group of second charging parameters. It can be learned from the third implementation of the first aspect that, in the charging process of the battery, the battery control apparatus obtains the second charging parameters whose charging currents are zero, and then determines the target battery module based on the second charging parameter. This provides a method for determining the target battery module, and improves implementability of the solution in actual application.

Based on any one of the first aspect and the first implementation of the first aspect to the third implementation of the first aspect of the embodiments of this application, in a fourth implementation of the first aspect of the embodiments of this application, obtaining, by the battery control apparatus, resistance values of second resistors includes obtaining, by the battery control apparatus, the resistance values of the second resistors based on the at least one group of second charging parameters and the resistance value of the first resistor.

Based on any one of the first aspect and the first implementation of the first aspect to the fourth implementation of the first aspect of the embodiments of this application, in a fifth implementation of the first aspect of the embodiments of this application, before obtaining the resistance values of the second resistors based on the at least one group of second charging parameters and the resistance value of the first resistor, the method further includes obtaining, by the battery control apparatus, a first target SOC based on the first charging parameter, where the first target SOC is an SOC corresponding to the first resistor when the charging current is zero, and then correcting the second terminal voltage based on the first target SOC, to obtain at least one group of corrected second charging parameters.

Corresponding to the fourth implementation of the first aspect, obtaining, by the battery control apparatus, the resistance values of the second resistors based on the at least one group of second charging parameters and the resistance value of the first resistor includes obtaining, by the battery control apparatus, the resistance values of the second resistors based on the at least one group of corrected second charging parameters and the resistance value of the first resistor. It can be learned from the fifth implementation of the first aspect that the battery control apparatus corrects the second terminal voltage based on the SOC corresponding to the first resistor when the charging current is zero. This ensures accuracy of the second terminal voltage.

Based on any one of the first aspect and the first implementation of the first aspect to the fifth implementation of the first aspect of the embodiments of this application, in a sixth implementation of the first aspect of the embodiments of this application, when the safe current is a safe discharging current, obtaining, by the battery control apparatus, a resistance value of a first resistor includes in a charging process of the battery, obtaining, by the battery control apparatus, at least one group of third charging parameters, where the at least one group of third charging parameters are charging parameters collected at different moments in a charging process, each of the at least one group of third charging parameters include third terminal voltages, third currents, third temperatures, and third SOCs that are respectively corresponding to the N battery modules, and the third SOCs are SOCs respectively corresponding to the N battery modules when the group of third charging parameters are obtained, then determining, based on the at least one group of third charging parameters, resistance values respectively corresponding to the N battery modules, and determining, from the resistance values respectively corresponding to the N battery modules, that a resistance value corresponding to the target battery module is the resistance value of the first resistor. It can be learned from the sixth implementation of the first aspect that, in the charging process of the battery, the battery control apparatus obtains the at least one group of third charging parameters whose charging currents are not zero, and determines the resistance value of the first resistor based on the third charging parameter. This improves accuracy of the resistance value of the first resistor.

Based on any one of the first aspect and the first implementation of the first aspect to the sixth implementation of the first aspect of the embodiments of this application, in a seventh implementation of the first aspect of the embodiments of this application, before determining, from the resistance values respectively corresponding to the N battery modules, that a resistance value corresponding to the target battery module is the resistance value of the first resistor, the method further includes within a preset time period after battery charging ends, obtaining, by the battery control apparatus, at least one group of target parameters, where the at least one group of target parameters are parameters collected at different moments after charging ends, each of the at least one group of target parameters include fourth terminal voltages, fourth currents, fourth temperatures, and fourth SOCs that are respectively corresponding to the N battery modules, and the fourth SOCs are SOCs respectively corresponding to the N battery modules when the group of target parameters are obtained, and then determining the target battery module based on the at least one group of target parameters. It can be learned from the seventh implementation of the first aspect that, within the preset time period after battery charging ends, the battery control apparatus obtains the at least one group of target parameters whose charging currents are zero, and determines the target battery module based on the target parameter. This provides a method for determining the target battery module, and improves implementability of the solution in actual application.

Based on any one of the first aspect and the first implementation of the first aspect to the seventh implementation of the first aspect of the embodiments of this application, in an eighth implementation of the first aspect of the embodiments of this application, the obtaining resistance values of second resistors includes obtaining the resistance values of the second resistors based on the at least one group of target parameters and the resistance value of the first resistor.

Based on any one of the first aspect and the first implementation of the first aspect to the eighth implementation of the first aspect of the embodiments of this application, in a ninth implementation of the first aspect of the embodiments of this application, before obtaining the resistance values of the second resistors based on the at least one group of target parameters and the resistance value of the first resistor, the method further includes obtaining a second target SOC, where the second target SOC is an SOC corresponding to the first resistor when charging ends, and correcting the fourth terminal voltage based on the second target SOC, to obtain at least one group of corrected target parameters.

Corresponding to the eighth implementation of the first aspect, obtaining the resistance values of the second resistors based on the at least one group of target parameters and the resistance value of the first resistor includes obtaining the resistance values of the second resistors based on the at least one group of corrected target parameters and the resistance value of the first resistor. It can be learned from the eighth implementation of the first aspect that the battery control apparatus corrects the second terminal voltage based on the SOC corresponding to the first resistor when the charging current is zero. This ensures accuracy of the second terminal voltage.

According to a second aspect of the embodiments of this application, a battery control apparatus is provided. The battery control apparatus includes a memory, a transceiver, and at least one processor. The memory stores an instruction. The memory, the transceiver, and the at least one processor are connected using a cable. The at least one processor invokes the instruction to perform a data processing or control operation performed on the battery control apparatus side according to the first aspect.

According to a third aspect of the embodiments of this application, a battery control apparatus is provided. The battery control apparatus includes a receiving unit, a processing unit, and a sending unit. The receiving unit is configured to perform the steps related to a receiving operation according to the first aspect and any possible implementation. The processing unit is configured to perform the steps related to a processing operation according to the first aspect and any possible implementation. The sending unit is configured to perform the steps related to a sending operation according to the first aspect and any possible implementation.

According to a fourth aspect of this application, a computer program product including an instruction is provided. The instruction is run on a computer, to perform the method according to any one of the first aspect or the possible implementations of the first aspect.

According to a fifth aspect of the embodiments of this application, a computer storage medium is provided. The computer storage medium stores an instruction, and when the instruction is run on a computer, the computer is enabled to perform the method according to any one of the first aspect or the possible implementations of the first aspect.

According to a sixth aspect of this application, a chip system is provided. The chip system includes at least one processor and a communications interface. The chip system may further include a memory. The memory, the communications interface, and the at least one processor are connected using a cable. The at least one memory stores an instruction. The instruction is executed by the processor, to perform the method according to any one of the first aspect or the possible implementations of the first aspect.

It can be learned from the foregoing technical solutions that the embodiments of this application have the following advantages.

In the embodiments, the battery control apparatus adjusts the current that passes through the battery to the safe current, where the safe current is the safe current corresponding to the battery module that has the largest resistance difference of the parallel branch circuits respectively corresponding to the battery cells in the same battery module such that the charging current of each battery module in the battery module is less than or equal to the safe current in order to ensure that the current of each battery cell is within the safe current range. This avoids overcharging or overdischarging of the battery and improves safety performance and the lifespan of the battery.

DESCRIPTION OF EMBODIMENTS

The following describes technical solutions of this application with reference to accompanying drawings.

Embodiments of this application provide a battery control method and a battery control apparatus, to control a current that passes through a battery to be less than or equal to a safe current corresponding to a battery module that has a largest resistance difference of parallel branch circuits respectively corresponding to battery cells in a same battery module such that a charging current or a discharging current of each battery cell in the battery module is within a safe current range. This improves safety performance and a lifespan of the battery.

Figure 1:
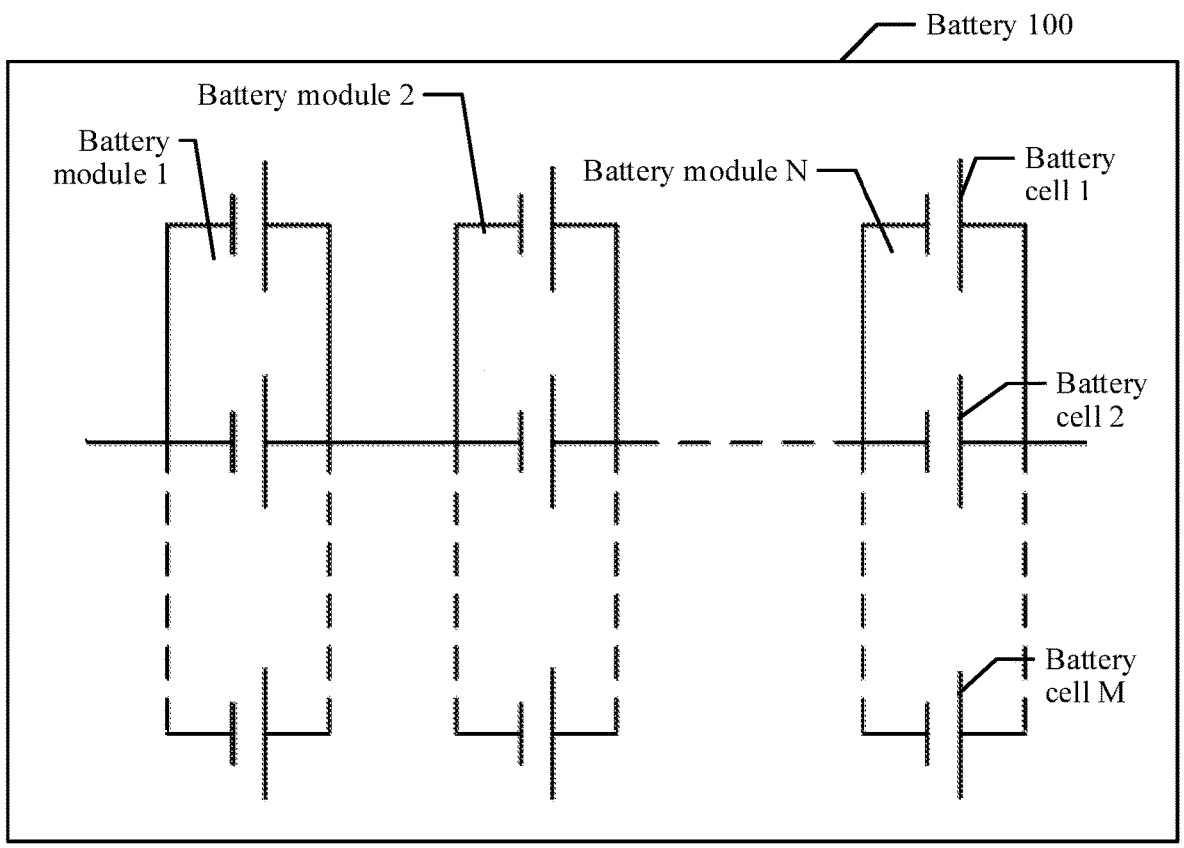
FIG. 1 is a schematic diagram of a battery according to an embodiment of this application.

FIG. 1 is a schematic diagram of a battery according to an embodiment of this application. The battery 100 includes N battery modules, the N battery modules are connected in series, each of the N battery modules includes M battery cells, and the M battery cells in each battery module are connected in parallel, where N is an integer greater than or equal to 1, and M is an integer greater than 1. It should be noted that, in actual application, a battery capacity and an internal resistance of each of the M battery cells may be the same as or similar to a battery capacity and an internal resistance of another of the M battery cells.

In this embodiment, the battery 100 may be a lithium-ion battery, or may be a dry battery. This is not limited herein. In this embodiment of this application, only the lithium-ion battery is used as an example for description.

Figure 2:
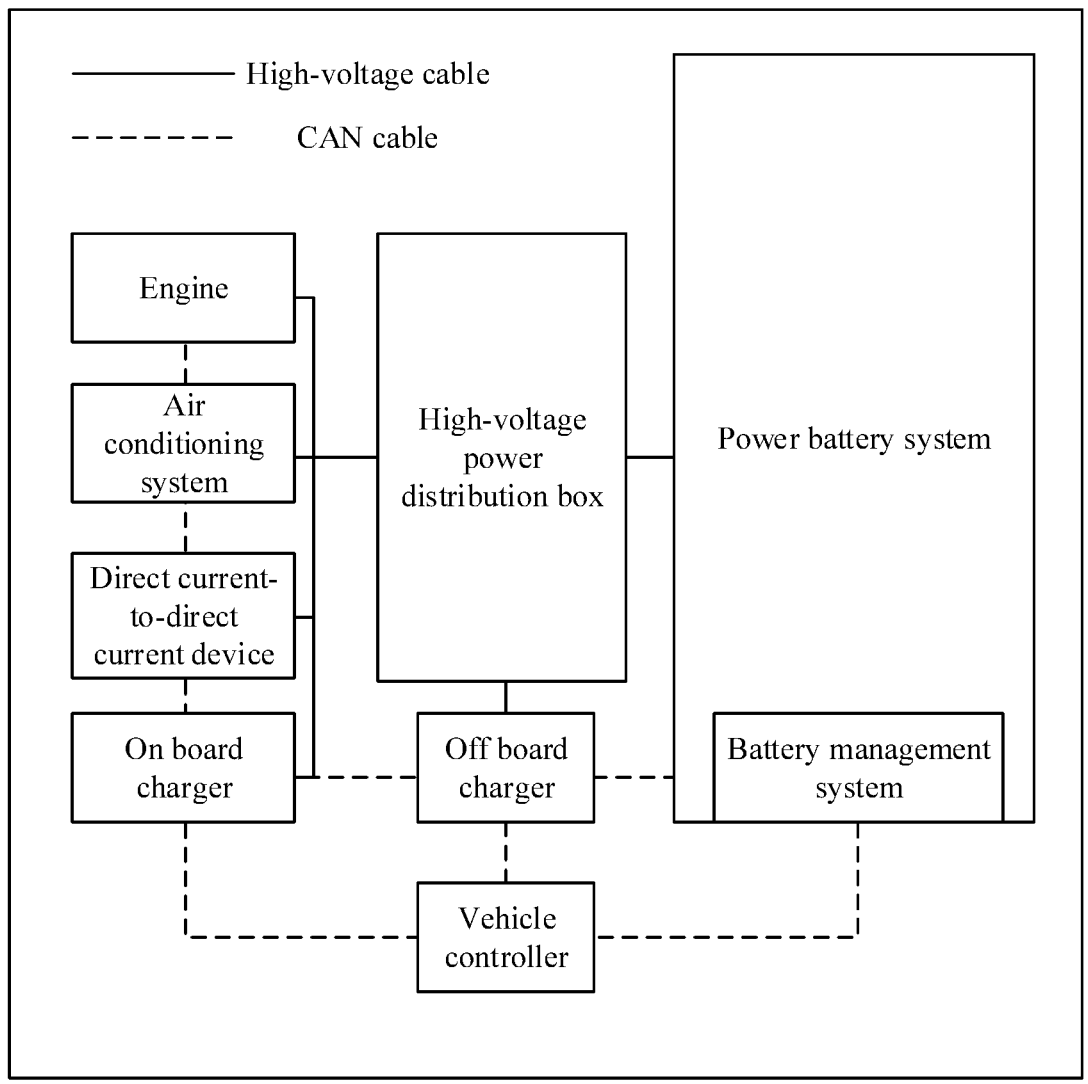
FIG. 2 is a schematic diagram of an application scenario according to an embodiment of this application.

FIG. 2 is a schematic diagram of an application scenario according to an embodiment of this application. The schematic diagram of the application scenario is a structural diagram of an entire vehicle system of an electric vehicle. The structural diagram of the entire vehicle system includes a power battery system, a high-voltage power distribution box, a battery management system (BMS), a vehicle control unit (VCU), an on-board charger (OBC), an off board charger (OFC), an air conditioning (AC) system, and a direct current-to-direct current (DC-DC) device.

The power battery system includes the battery 100. The power battery system is a power source of the electric vehicle, and can provide sufficient energy and power for the entire vehicle, to meet a continuous mileage and a power requirement of the entire vehicle.

The BMS is a monitoring and management unit of a power battery, and is configured to control a battery to ensure that a battery system is in a safe state at any moment.

The VCU is a core electronic control unit that controls a decision-making of an electric vehicle.

The OBC is a vehicle battery charging device of an electric vehicle, and is a conversion apparatus having a specific power function that is used when a battery is charged. The OBC in this embodiment may be an alternating current charging in-vehicle motor.

The OFC is a vehicle direct current battery charging device of an electronic device, and may be a direct current charging pile or a fast charging pile.

It should be noted that the embodiments of this application may be applied to the battery system of the electric vehicle, or may be applied to a battery system in another field. This is not limited herein. In the embodiments of this application, charging and discharging of a battery in an electric vehicle are merely used as an example for description.

The foregoing describes the system of the battery and the electric vehicle in this embodiment. The following describes a battery control method in this embodiment from a perspective of battery charging.

Figure 3:
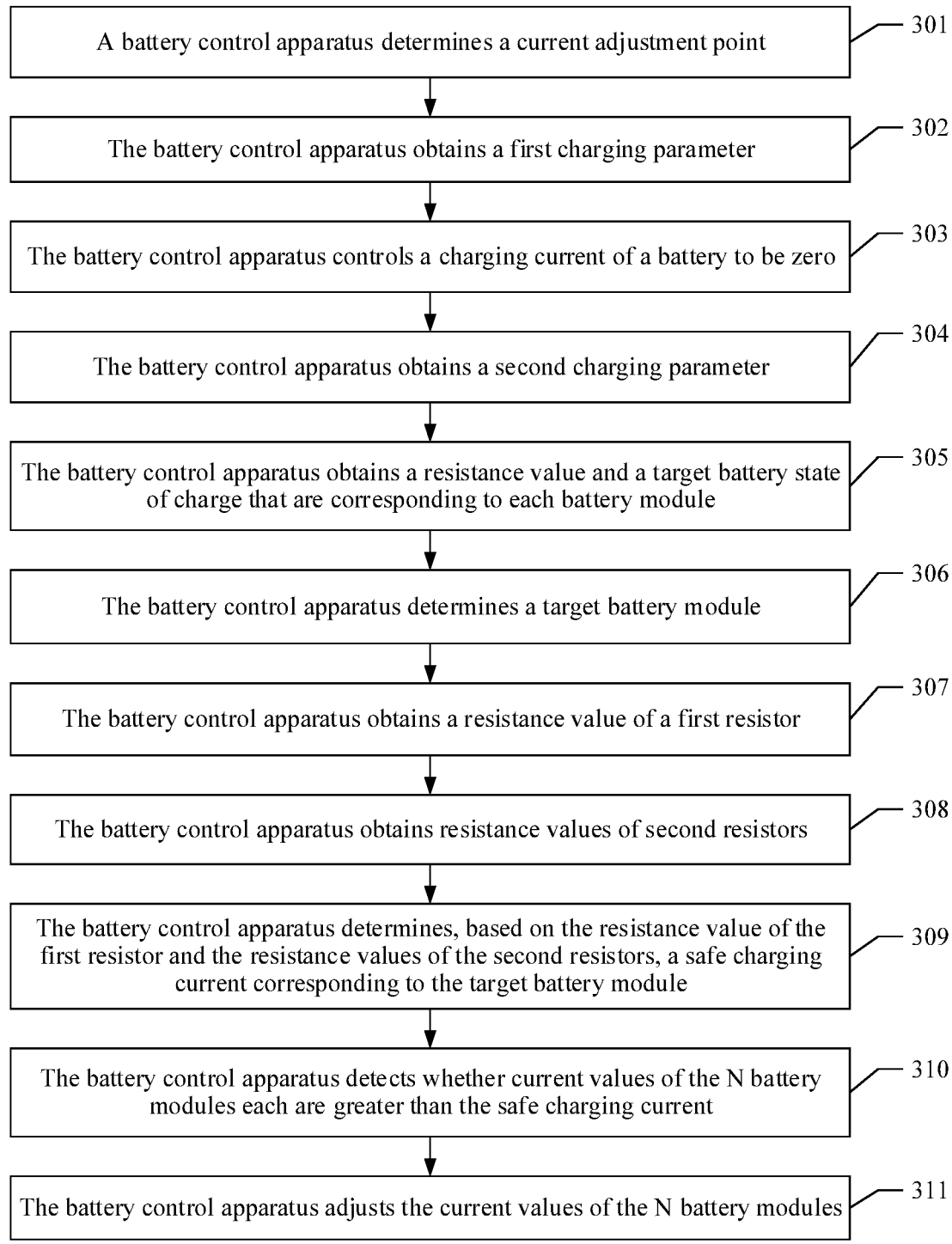
FIG. 3 is a schematic flowchart of a battery control method according to an embodiment of this application.

FIG. 3 is a schematic flowchart of a battery control method according to an embodiment of this application. As shown in FIG. 3, the battery control method provided in this embodiment of this application may include the following steps.

301: A battery control apparatus determines a current adjustment point.

The battery control apparatus controls, based on an initial battery SOC ($SOC_0$) and a target battery SOC ($SOC_{Trg}$), to determine the current adjustment point. $SOC_{Trg}$ is an SOC corresponding to a battery when charging ends, and the current adjustment point is used to indicate the battery control apparatus to adjust a current charging current of a battery module to zero. Further, the current adjustment point may be any SOC between $SOC_0$ and $SOC_{Trg}$. For example, when $SOC_0$ of the battery is 15% ($SOC_0$-15%), and $SOC_{Trg}$ is 98% ($SOC_{Trg}$-98%), the battery control apparatus may determine any SOC between $SOC_0$-15% and $SOC_{Trg}$-98% as the current adjustment point. For example, SOC-30% may be determined as the current adjustment point.

It should be noted that, in this embodiment, the battery control apparatus may further determine a battery SOC critical point ($SOC_L$) between $SOC_0$ and $SOC_{Trg}$. The $SOC_L$ is used to determine the current adjustment point. In actual application, $SOC_L$ may be a critical point between fast charging and slow charging of the battery. Further, when the critical point between fast charging and slow charging of the battery is SOC-80%, the battery control apparatus determines that the $SOC_L$ is 80%. That is, the battery control apparatus may determine a current adjustment point in any SOC between SOC and SOC-80%, and determine another current adjustment point at any SOC between SOC-80% and $SOC_{Trg}$.

It should be noted that, in this embodiment, the battery control apparatus may further determine a plurality of $SOC_L$s in any SOC between $SOC_0$ and $SOC_{Trg}$, and then determine a plurality of current adjustment points based on the plurality of $SOC_L$s.

302: The battery control apparatus obtains a first charging parameter.

In a charging process of the electric vehicle, before a battery SOC reaches the current adjustment point, the battery control apparatus may obtain at least one group of first charging parameters at different charging time points, where charging currents corresponding to the first charging parameters are not zero. Further, the battery control apparatus may obtain a group of first charging parameters at a moment T1, and obtain another group of first charging parameters at a moment T2. It should be noted that the first charging parameters include a first terminal voltage of each battery module in the battery, a first current that passes through each battery module, a first temperature corresponding to each battery module when the first charging parameter is obtained, and a battery SOC corresponding to each battery module when the first charging parameter is obtained. The SOC is a ratio of a remaining capacity of the battery module to a saturated capacity of the battery module. In this embodiment, a charging current corresponding to T1 and a charging current corresponding to T2 are not zero.

It should be noted that, in this embodiment, the at least one group of first charging parameters obtained by the battery control apparatus may include the first terminal voltage, the first current, the first temperature, and the first SOC, and may further include another parameter. This is not limited herein.

For details of the first charging parameters obtained by the battery control apparatus at the moment T1, refer to Table 3-1.

TABLE 3-1

| Module | Moment | First terminal voltage in volts (V) | First current in amperes (A) | First temperature in Celsius (° C.) | First SOC |
|---|---|---|---|---|---|
| Battery module 1 | T1 | 3 | 5 | 15 | 21% |
| Battery module 2 | T1 | 4 | 5 | 16 | 20% |
| ... | ... | ... | ... | ... | ... |
| Battery module N | T1 | 3 | 5 | 17 | 23% |

The first charging parameters obtained by the battery control apparatus at the moment T2 are similar to the first charging parameters obtained at the moment T1. Details are not described herein again. For details, refer to 3-1.

303: The battery control apparatus controls a charging current of the battery to be zero.

In a charging process of the electric vehicle, when the SOC of the battery reaches the current adjustment point, the battery control apparatus adjusts the charging current of the battery to zero using a current adjustment unit. For example, when the current adjustment point of the battery is SOC-30%, in the charging process, when the SOC of the battery reaches SOC-30%, the battery control apparatus adjusts the charging current of the battery to zero.

304: The battery control apparatus obtains a second charging parameter.

After the battery control apparatus adjusts the charging current of the battery to zero, a state in which the charging current is zero is kept for Δt duration, and then within the Δt duration, the battery control apparatus obtains at least one group of second charging parameters at different moments, that is, obtains at least one group of charging parameters whose charging currents are zero. The second charging parameters include a second terminal voltage, a second current, a second temperature, and a second SOC of each battery module in the battery. The second terminal voltages may be respectively {U1, U2, ..., UN}.

Further, the battery control apparatus obtains a group of second charging parameters at a moment T3, and obtains another group of second charging parameters at a moment T4. It should be noted that a charging current corresponding to T3 and a charging current corresponding to T4 in this embodiment are zero.

For details of the second charging parameters obtained by the battery control apparatus at the moment T3, refer to Table 3-2.

TABLE 3-2

Second charging parameter

| Module | Moment | Second terminal voltage (V) | Second current (A) | Second temperature (° C.) | Second SOC |
|---|---|---|---|---|---|
| Battery module 1 | T3 | 5 | 0 | 17 | 29% |
| Battery module 2 | T3 | 6 | 0 | 18 | 30% |
| ... | ... | ... | ... | ... | ... |
| Battery module N | T3 | 5 | 0 | 17 | 29% |

The second charging parameters obtained by the battery control apparatus at the moment T4 are similar to the second charging parameters obtained at the moment T3. Details are not described herein again. For details, refer to 3-2.

305: The battery control apparatus obtains a resistance value and a target battery SOC that are corresponding to each battery module.

After the battery control apparatus obtains the at least one group of first charging parameters, the battery control apparatus determines, based on the at least one group of first charging parameters, the resistance value and the target SOC that are corresponding to each battery module, where the resistance value corresponding to each battery module is a resistance value corresponding to each battery module at the current adjustment point, and the target battery SOC is a SOC corresponding to each battery module at the current adjustment point. Further, the resistance value and the target SOC that are corresponding to each battery module are $\{(R_1, SOC_1), (R_2, SOC_2), \ldots, (R_N, SOC_N)\}$. $(R_1, SOC_1)$ is an internal resistance value and a target battery SOC of a first battery module, and by analogy, $(R_N, SOC_N)$ is an internal resistance value and a target battery SOC of an $N^{th}$ battery module.

In this embodiment, the battery control apparatus may identify the first charging parameter using a least square method, and then obtain $\{(R_1, SOC_1), (R_2, SOC_2), \ldots, (R_N, SOC_N)\}$ according to an extended Kalman filter (EKF) algorithm. Without loss of generality, in this embodiment, another algorithm may further be used to obtain the resistance value and the target battery SOC that are corresponding to each battery module. This is not limited herein.

306: The battery control apparatus determines a target battery module.

The battery control apparatus determines, based on the second charging parameter and $\{(R_1, SOC_1), (R_2, SOC_2), \ldots, (R_N, SOC_N)\}$, a battery module that has a largest resistance difference of parallel branch circuits respectively corresponding to battery cells in a same battery module, where the battery module that has the largest resistance difference of the parallel branch circuits respectively corresponding to the battery cells in the same battery module is the target battery module.

Further, after the battery control apparatus determines that target battery SOCs of the N battery modules are respectively $\{SOC_1, SOC_2, \ldots, SOC_N\}$, the battery control apparatus sorts $\{SOC_1, SOC_2, \ldots, SOC_N\}$ in descending order according to a charge capacity of the target battery SOCs as follows: $\{SOC_1', SOC_2', \ldots, SOC_N'\}$. A battery module corresponding to $SOC_N'$ has a minimum charge capacity, and a battery module corresponding to $SOC_1'$ has a maximum charge capacity, and then the battery control apparatus separately obtains differences between $SOC_1'$, $SOC_2'$, ..., $SOC_{N-1}'$ and $SOC_N'$, to obtain differences $\{\Delta SOC_1, \Delta SOC_2, \ldots, \Delta SOC_{N-1}\}$ between $SOC_1'$, $SOC_2'$, ..., $SOC_{N-1}'$ and the battery module that has the minimum battery SOC.

The battery control apparatus obtains, based on $\{\Delta SOC_1, \Delta SOC_2, \ldots, \Delta SOC_{N-1}\}$ and a battery SOC-OCV curve, voltage differences $\{\Delta U_1, \Delta U_2, \ldots, \Delta U_{N-1}, 0\}$ between all battery modules in the battery module and the battery module that has the minimum battery SOC.

Figure 4:
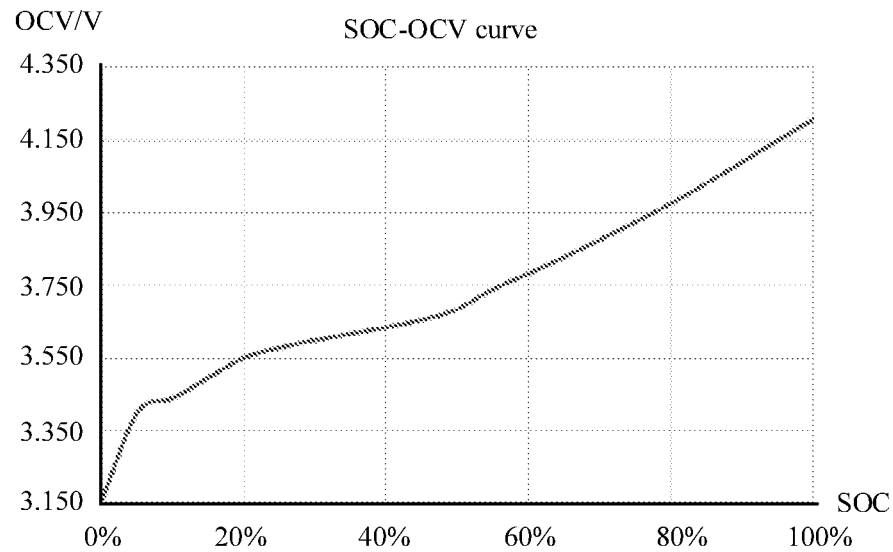
FIG. 4 is a schematic diagram of a SOC versus open-circuit voltage (OCV) SOC-OCV curve according to an embodiment of this application.

The following uses a lithium battery as an example to describe voltage differences $\{\Delta U_1, \Delta U_2, \ldots, \Delta U_{N-1}\}$, obtained by the battery control apparatus, between all battery modules and a battery module that has a minimum battery SOC. Refer to Table 3-2 and FIG. 4. Table 3-3 is a correspondence between an SOC and an OCV in the lithium battery, and FIG. 4 is an SOC-OCV curve corresponding to Table 3-2.

TABLE 3-3

Correspondence between SOC and OCV

| SOC | OCV/V |
|---|---|
| 0% | 3.164 |
| 5% | 3.404 |
| 10% | 3.441 |

TABLE 3-3-continued

Correspondence between SOC and OCV

| SOC | OCV/V |
|---|---|
| 15% | 3.499 |
| 20% | 3.552 |
| ... | ... |
| 90% | 4.088 |
| 95% | 4.148 |
| 100% | 4.206 |

That $\Delta SOC_1$ is 2% and $SOC_1$-18% are used as an example to describe a voltage difference between a battery module corresponding to $\Delta SOC_1$ and a battery module that has a minimum battery SOC. Further, it can be learned from Table 3-2 that $SOC_1$-18% is located between SOC-15% and SOC-20%. Further, an open-circuit voltage of SOC-20% is 3.552 V, and an open-circuit voltage of SOC-15% is 3.499 V. Therefore, the voltage difference $\Delta U_1$ between the battery module corresponding to $\Delta SOC_1$ and the battery module that has the minimum battery SOC is 0.0035 mV.

After the battery control apparatus obtains $\{\Delta U_1, \Delta U_2, \ldots, \Delta U_{N-1}, 0\}$, the battery control apparatus resorts, corresponding to $\{SOC_1', SOC_2', \ldots, SOC_N'\}$, second terminal voltages $\{U_1, U_2, \ldots, U_N\}$ in the second charging parameters, to obtain $\{U_1', U_2', \ldots, U_N'\}$.

The battery control apparatus corrects the second terminal voltages in the second charging parameters based on $\{\Delta U_1, \Delta U_2, \ldots, \Delta U_{N-1}, 0\}$. Further, the battery control apparatus respectively subtracts $\{\Delta U_1, \Delta U_2, \ldots, \Delta U_{N-1}, 0\}$ from $\{U_1', U_2', \ldots, U_N'\}$ to obtain corrected second terminal voltages of the N battery modules, and the corrected second terminal voltages of the N battery modules are respectively $\{U_1'', U_2'', \ldots, U_N''\}$.

Figure 5:
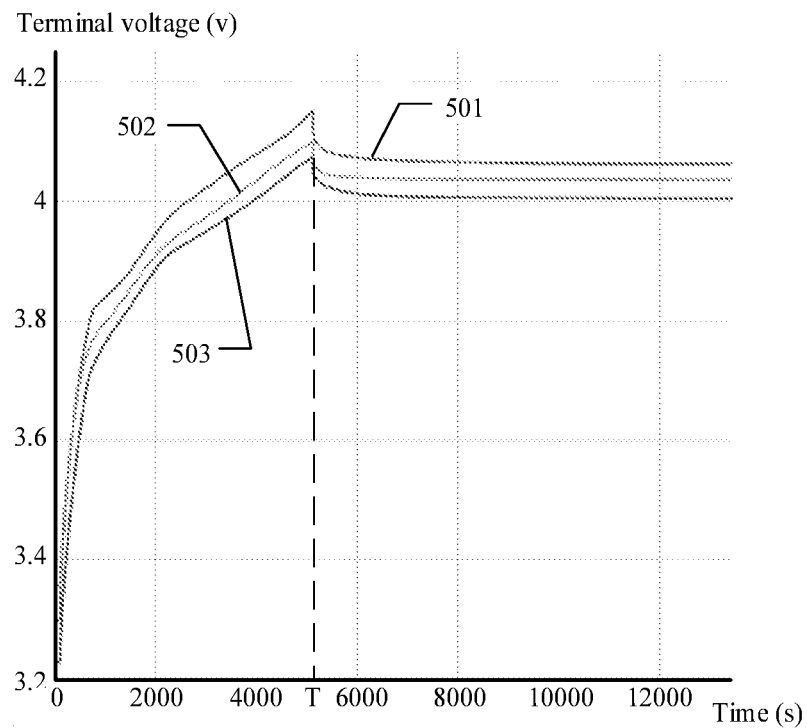
FIG. 5 is a schematic diagram of a voltage recovery curve according to an embodiment of this application.

After the battery control apparatus controls the charging current of the battery to be zero, within $\Delta t$ duration, terminal voltage recovery curves of the N battery modules may be obtained based on $\{U_1'', U_2'', \ldots, U_N''\}$ at different moments, where N battery modules correspond to N terminal voltage recovery curves $\{U_1'', U_2'', \ldots, U_N''\}_{0 \to \Delta t}$. It may be understood that, a resistance of the battery cell in the battery module includes an ohmic internal resistance and a polarization internal resistance. After the charging current of the battery is controlled to be zero, a voltage of the ohmic internal resistance instantaneously decreases to zero, and a voltage of the polarization internal resistance tends to be zero within the $\Delta t$ duration. Therefore, the terminal voltage of the battery module recovers to a stable voltage within the $\Delta t$ duration. As shown in FIG. 5, the battery control apparatus controls, at a moment T corresponding to a current adjustment point, the charging current of the battery to be zero. Due to an effect of the ohmic internal resistance and the polarization internal resistance, the terminal voltage corresponding to the battery module is recovered to a relatively stable terminal voltage. Because the resistance of the battery cell varies, voltage recovery curves of different battery modules are different. FIG. 5 shows voltage recovery curves 501 to 503. The curve 501 is a maximum voltage recovery curve, and the curve 503 is a minimum voltage recovery curve.

The battery control apparatus determines a maximum terminal voltage recovery curve $\{U_{max}\}_{0 \to \Delta t}$ and a minimum terminal voltage recovery curve $\{U_{min}\}_{0 \to \Delta t}$ from N terminal voltage recovery curves $\{U_1'', U_2'', \ldots, U_N''\}_{0 \to \Delta t}$. It may be understood that, after a charging voltage of the battery is adjusted to zero, each of the N battery modules is affected only by a cross current in the module. Therefore, the battery control apparatus determines that $\{U_{max}\}_{0 \to \Delta t}$ corresponds to a battery module that has a largest resistance difference of parallel branch circuits respectively corresponding to battery cells in a same battery module, and $\{U_{min}\}_{0 \to \Delta t}$ corresponds to a battery module that has a smallest resistance difference of parallel branch circuits respectively corresponding to battery cells in a same battery module or a module that has no resistance difference of parallel branch circuits respectively corresponding to battery cells in a same battery module.

Therefore, the battery module corresponding to the maximum terminal voltage recovery curve $\{U_{max}\}_{0 \to \Delta t}$ is the module that has the largest resistance difference of the parallel branch circuits respectively corresponding to the battery cells in the same battery module. To be specific, the battery module corresponding to the maximum terminal voltage recovery curve $\{U_{max}\}_{0 \to \Delta t}$ is the target battery module.

307: The battery control apparatus obtains a resistance value of a first resistor.

The resistance value of the first resistor is a resistance value corresponding to the target battery module. That is, the resistance value of the first resistor is a resistance value of the battery module that has the largest resistance difference of the parallel branch circuits respectively corresponding to the battery cells in the same battery module. Therefore, the battery control apparatus determines, from $\{(R_1, SOC_1), (R_2, SOC_2), \ldots, (R_N, SOC_N)\}$, a resistance value $\{Rx\}$ of the battery module corresponding to the maximum terminal voltage recovery curve $\{U_{max}\}_{0 \to \Delta t}$. The resistance value of the first resistor is $\{R_x\}$.

308: The battery control apparatus obtains resistance values of second resistors.

The battery control apparatus obtains the resistance values of the second resistors based on a sum of resistances of the parallel branch circuits respectively corresponding to the M battery cells in the target battery module and the resistance value $\{R_x\}$ of the first resistor.

Further, an example in which the target battery module includes two battery cells is used for description. A resistance value of a battery cell 1 is $R_{o1}$, and a resistance value of a battery cell 2 is $R_{o2}$. The battery cell 1 and the battery cell 2 are connected in parallel.

Further, the battery control apparatus obtains a difference $\{\Delta U\}_{0 \to \Delta t}$ between $\{U_{max}\}_{0 \to \Delta t}$ and $\{U_{min}\}_{0 \to \Delta t}$, and performs second-order exponential function fitting on $\{\Delta U\}_{0 \to \Delta t}$ to obtain exponent coefficients b and d. For details, refer to second-order exponential function fitting Formula 3-1:

$$\Delta U = ae^{b\Delta t} + ce^{d\Delta t}, \quad \text{(Formula 3-1)}$$

where $\Delta U$ is a dependent variable $\{\Delta U\}_{0 \to \Delta t}$, $\Delta t$ is an independent variable $0 \to \Delta t$, a, b, c, and d are exponential coefficients, and e is a natural exponent.

After performing second-order exponential function fitting on $\{\Delta U\}_{0 \to \Delta t}$ to obtain the exponent coefficients b and d, the battery control apparatus obtains a sum of resistances $R_{o1}$ and $R_{o2}$ based on b and d. For example, the battery control apparatus obtains, according to Formula (3-2), a sum of resistances of parallel branch circuits corresponding to two battery cells. For details, refer to Formula 3-2:

$$R_{o1} + R_{o2} = \frac{k}{18bdQR_pC_p}, \quad \text{(Formula 3-2)}$$

where k is an approximate linear coefficient of OCV and SOC in a relatively small SOC range, Q is a nominal capacity of the battery, Q may be a value of multiplying a time by a current of the battery in a process from full charging to full discharging at a constant rate, and a unit may be ampere hours (Ah) or milliamphere hours (mAh), Pp is a polarization internal resistance, Rp may be a resistance element that is in an equivalent circuit model (ECM) and that is used to represent a battery polarization characteristic, Cp is a polarization capacitance, Cp may be a capacitor element that is in an ECM model and that is used to represent a battery polarization characteristic, and the ECM may be an equivalent model that is output by a terminal voltage simulated by a circuit in which an RC element and a variable voltage source are connected in series and in parallel.

In addition, it can be learned from the summation formula of the resistances of the parallel circuits that the resistance value $\{R_x\}$ of the first resistor may be expressed using Formula 3-3:

$$\frac{R_{o1}R_{o2}}{R_{o1}+R_{o2}} = R_x. \quad \text{(Formula 3-3)}$$

It can be learned that, according to Formula (3-2) and Formula (3-3), it can be obtained that the resistance value of the battery cell 1 is $R_{o1}$, and the resistance value of the battery cell 2 is $R_{o2}$.

309: The battery control apparatus determines, based on the resistance value of the first resistor and the resistance values of the second resistors, a safe charging current corresponding to the target battery module.

After the battery control apparatus obtains the resistance values respectively corresponding to the M battery cells in the target battery module, the battery control apparatus obtains, using a battery simulation model, branch currents $I_{\{\rightarrow 100\%\}}$ respectively corresponding to the M battery cells in the target battery module. For example, $R_{o1}$ is used as a substitute in the battery simulation model to obtain a branch current $I_{1\{0 \rightarrow 100\%\}}$ when the battery cell 1 is charged from SOC-0% to SOC-100% using a charging current I, and $R_{o2}$ is used as a substitute in the battery simulation model to obtain a branch current $I_{2\{\rightarrow 100\%\}}$ when the battery cell 2 is charged from SOC-0% to SOC-100% using a charging current I. A ratio $k_1$ of a branch current of a parallel branch corresponding to the battery cell 1 to the charging current I, namely, $k_1 = I_{1\{SOC(t)\}}/I$ may be obtained using $I_{1\{0 \rightarrow 100\%\}}$, and a ratio $k_2$ of a branch current of a parallel branch corresponding to the battery cell 2 to the charging current I, namely, $k_2 = I_{2\{SOC(t)\}}/I$ may be obtained using $I_{2\{0 \rightarrow 100\%\}}$.

The battery control apparatus obtains a current SOC of the battery and a current temperature of the battery, to determine a maximum charging current threshold Imax allowed by the M battery cells.

Further, the battery control apparatus obtains, by querying a maximum charging current threshold table, the maximum charging current threshold Imax allowed by the battery cell. For example, a maximum charging current threshold table of the lithium battery may be shown in Table 3-4.

TABLE 3-4

| | Maximum charging current threshold Imax | | | | | |
|---|---|---|---|---|---|---|
| | SOC = 0% | SOC = 10% | SOC = 20% | ... | SOC = 80% | SOC = 90% |
| Temperature = −10° C. | 10 | 10 | 10 | ... | 10 | 5 |
| Temperature = 0° C. | 10 | 10 | 10 | ... | 10 | 5 |
| Temperature = 10° C. | 15 | 15 | 15 | ... | 15 | 10 |
| Temperature = 20° C. | 20 | 20 | 20 | ... | 20 | 15 |
| Temperature = 30° C. | 25 | 25 | 25 | ... | 25 | 20 |
| Temperature = 40° C. | 10 | 10 | 10 | ... | 10 | 5 |

A

As shown in Table 3-4, it may be understood that, when the temperature of the battery cell is −10° C. and the SOC of the battery cell is 0%, the maximum charging current threshold Imax of the battery cell is 10 A, to be specific, the battery cell can allow a maximum current of 10 A.

Therefore, in this embodiment, the battery control apparatus may obtain the maximum charging current threshold Imax of the battery cell by querying the table.

The battery control apparatus obtains, based on $k_1$, $k_2$, and the maximum charging current threshold Imax allowed by the battery cell, a safe charging current Isafe allowed by the target battery module. Further, Isafe=min{Imax/$k_1$, Imax/$k_2$}, to be specific, the safe charging current Isafe corresponding to the target battery module is equal to min{Imax/$k_1$, Imax/$k_2$}.

310: The battery control apparatus detects whether current value of the N battery modules is greater than the safe charging current, and if yes, step 311 is performed.

In the charging process of the battery, the battery control apparatus may detect, in real time using a detection unit, whether current value of charging currents of the N battery modules included in the battery is greater than the safe charging current Isafe.

If the current value of the charging current of the N battery modules included in the battery is greater than the safe charging current Isafe, the charging currents of the battery may be adjusted.

If the current value of the charging current of the N battery modules included in the battery is less than or equal to the safe charging current Isafe, the battery charging state continues to be maintained.

311: The battery control apparatus adjusts the current value of the N battery modules.

When the battery control apparatus detects that a charging current of at least one of the N battery modules in the battery is greater than the safe charging current Isafe, the battery control apparatus adjusts the charging currents of the N battery modules such that the current value respectively corresponding to the N battery modules is equal to or less than the safe charging current.

In this embodiment, the battery control apparatus determines, by obtaining the charging parameter of each battery module before the charging current is zero and the charging parameter of each battery module when the charging current is zero, the target battery module that has the largest resistance difference of the parallel branch circuits corresponding to the battery cells in the same battery module, then obtains the safe charging current corresponding to the target battery module, and controls the charging current of the battery module to be less than or equal to the safe charging current in order to ensure that the charging current of the battery is in a safe state. Therefore, in a charging process of the battery, a charging current of each battery cell in a battery module in a different SOC period is within a safe current range. This avoids battery overcharging and improving charging safety.

The foregoing describes the battery control method provided in the embodiments of this application from a perspective of battery charging, and the following describes the battery control method provided in the embodiments of this application from a perspective of battery discharging.

Figure 6:
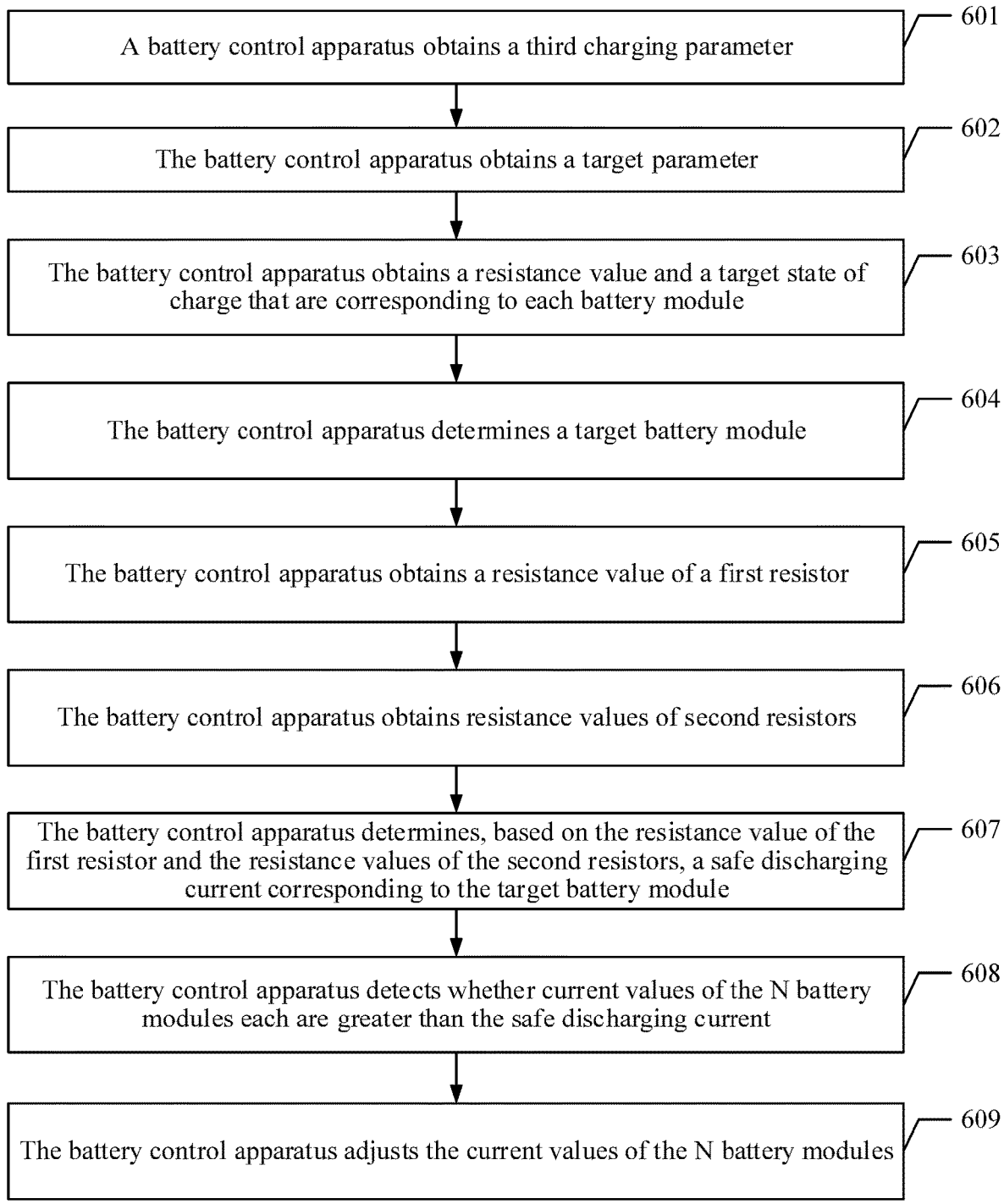
FIG. 6 is a schematic flowchart of another battery control method according to an embodiment of this application.

FIG. 6 is a schematic flowchart of another battery control method according to an embodiment of this application. As shown in FIG. 6, the battery control method provided in this embodiment of this application may include the following steps.

601: A battery control apparatus obtains a third charging parameter.

After electric vehicle charging ends, the battery control apparatus obtains at least one group of third charging parameters at different moments. Further, the battery control apparatus may obtain a group of third charging parameters at a moment T1, and obtain another group of third charging parameters at a moment T2. It should be noted that the third charging parameters include a third terminal voltage of each battery module in the battery, a third current that passes through each battery module, a third temperature corresponding to each battery module when the third charging parameter is obtained, and an SOC corresponding to each battery module when the third charging parameter is obtained.

It should be noted that, in this embodiment, the at least one group of third charging parameters obtained by the battery control apparatus may include the third terminal voltage, the third current, the third temperature, and the third SOC, and may further include another parameter. This is not limited herein.

In this embodiment, the third charging parameters obtained by the battery control apparatus are similar to the charging parameters corresponding to Table 3-1. For details, refer to Table 3-1. Details are not described herein again.

602: The battery control apparatus obtains a target parameter.

After the battery control apparatus determines that vehicle charging ends or battery charging is suspended, the battery control apparatus starts to obtain at least one group of target parameters after battery charging ends or battery charging is suspended for T minutes. The at least one group of target parameters include a fourth terminal voltage, a fourth current, a fourth temperature, and a fourth SOC of each battery module in the battery. For example, terminal voltages of the N battery modules are respectively $\{U_1, U_2, \ldots, U_n\}$.

Further, for example, after battery charging ends or battery charging is suspended for 2 minutes, the battery control apparatus starts to obtain at least one group of target parameters at different time points. For example, at a moment T5, the battery control apparatus obtains one group of target parameters, and at a moment T6, the battery control apparatus obtains another group of target parameters. It should be noted that, in this embodiment, the T5 and T6 moments are moments after battery charging ends or battery charging is suspended for 2 minutes.

In this embodiment, the target parameters obtained by the battery control apparatus are similar to the charging parameters corresponding to Table 3-2. For details, refer to Table 3-2. Details are not described herein again.

603: The battery control apparatus obtains a resistance value and a target SOC that are corresponding to each battery module.

After the battery control apparatus obtains the at least one group of third charging parameters, the battery control apparatus determines, based on the at least one group of third charging parameters, the resistance value and the target SOC that are corresponding to each battery module. The resistance value corresponding to each battery module is a resistance value of each battery module at a corresponding moment when charging ends, and the target battery SOC is a SOC of each battery module at a corresponding moment when charging ends. Further, the resistance value and the target SOC that are corresponding to each battery module are $\{(R_1, SOC_1), (R_2, SOC_2), \ldots, (R_N, SOC_N)\}$. $(R_1, SOC_1)$ is an internal resistance value and a target battery SOC of a first battery module, and by analogy, $(R_N, SOC_N)$ is an internal resistance value and a target battery SOC of an $N^{th}$ battery module.

In this embodiment, the battery control apparatus may identify the first charging parameter using a least square method, and then obtain $\{(R_1, SOC_1), (R_2, SOC_2), \ldots, (R_N, SOC_N)\}$ according to an EKF algorithm. Without loss of generality, in this embodiment, another algorithm may further be used to obtain the resistance value and the target battery SOC that are corresponding to each battery module. This is not limited herein.

604: The battery control apparatus determines a target battery module.

The battery control apparatus determines, based on the fourth charging parameter and $\{(R_1, SOC_1), (R_2, SOC_2), \ldots, (R_N, SOC_N)\}$, a battery module that has a largest resistance difference of parallel branch circuits respectively corresponding to battery cells in a same battery module, where the battery module that has the largest resistance difference of the parallel branch circuits respectively corresponding to the battery cells in the same battery module is the target battery module.

In this embodiment, that the battery control apparatus determines, based on the fourth charging parameter and $\{(R_1, SOC_1), (R_2, SOC_2), \ldots, (R_N, SOC_N)\}$, the battery module that has the largest resistance difference of the parallel branch circuits respectively corresponding to the battery cells in the same battery module is similar to that the battery control apparatus determines, based on the second charging parameter and $\{(R1, SOC1), (R2, SOC2), \ldots, (RN, SOCN)\}$, the battery module that has the largest resistance difference of the parallel branch circuits respectively corresponding to the battery cells in the same battery module in the step 306 in FIG. 3. Details are not described herein again.

605: The battery control apparatus obtains a resistance value of a first resistor.

606: The battery control apparatus obtains resistance values of second resistors.

In this embodiment, the steps 605 and 606 are similar to the steps 307 and 308 in the embodiment corresponding to FIG. 3. Details are not described herein again.

607: The battery control apparatus determines, based on the resistance value of the first resistor and the resistance values of the second resistors, a safe discharging current corresponding to the target battery module.

After the battery control apparatus obtains resistance values respectively corresponding to the M battery cells in the target battery module, the battery control apparatus obtains, using a battery simulation model, branch currents $I_{\{\rightarrow 100\%\}}$ respectively corresponding to the M battery cells in the target battery module. For example, $R_{o1}$ is used as a substitute in the battery simulation model to obtain a branch current $i_{1\{100\%\rightarrow 0\}}$ when a battery cell 1 is discharged from SOC-100% to SOC-0% using a discharging current i, and $R_{o2}$ is used as a substitute in the battery simulation model to obtain a branch current $i_{2\{100\%\rightarrow 0\}}$ when a battery cell 2 is discharged from SOC-100% to SOC-0% using a discharging current i. A ratio $k_3$ of a branch current of a parallel branch corresponding to the battery cell 1 to the discharging current i, namely, $k_3=i_{1\{100\%\rightarrow 0\}}/i$ may be obtained using $i_{1\{100\%\rightarrow 0\}}$ and a ratio $k_4$ of a branch current of a parallel branch corresponding to the battery cell 2 to the discharging current i, namely, $k_4=i_{2\{100\%\rightarrow 0\}}/i$ may be obtained using $i_{2\{100\%\rightarrow 0\}}$.

The battery control apparatus obtains a current SOC of the battery and a current temperature of the battery, to determine a maximum discharging current threshold imax allowed by the M battery cells.

Further, the battery control apparatus obtains, by querying a maximum discharging current threshold table, the maximum discharging current threshold imax allowed by the battery cell. For example, a maximum discharging current threshold table of the lithium battery may be shown in Table 3-3.

TABLE 3-5

| | Maximum charging current threshold imax | | | | | |
|---|---|---|---|---|---|---|
| | SOC = 0% | SOC = 10% | SOC = 20% | ... | SOC = 80% | SOC = 90% |
| Temperature = −10° C. | 0 | 20 | 20 | ... | 20 | 10 |
| Temperature = 0° C. | 0 | 20 | 20 | ... | 20 | 10 |
| Temperature = 10° C. | 0 | 30 | 30 | ... | 30 | 30 |
| Temperature = 20° C. | 0 | 40 | 40 | ... | 40 | 40 |
| Temperature = 30° C. | 0 | 50 | 50 | ... | 50 | 20 |
| Temperature = 40° C. | 0 | 20 | 20 | ... | 20 | 10 |
| | | | A | | | |

As shown in Table 3-5, it may be understood that, when the temperature of the battery cell is −10° C. and the SOC of the battery cell is 80%, the maximum charging current threshold imax of the battery cell is 20 A, to be specific, the battery cell can allow a maximum discharging current of 20 A.

Therefore, in this embodiment, the battery control apparatus may obtain the maximum discharging current threshold of the battery cell by querying the table.

The battery control apparatus obtains, based on $k_3$, $k_4$, and the maximum discharging current threshold Imax allowed by the battery cell, a safe discharging current isafe allowed by the target battery module. Further, isafe=min{imax/$k_3$, imax/$k_4$}, to be specific, the safe discharging current isafe corresponding to the target battery module is equal to min{imax/$k_3$, imax/$k_4$}.

608: The battery control apparatus detects whether current value of the N battery modules is greater than the safe discharging current, and if yes, step 609 is performed.

In the discharging process of the battery, the battery control apparatus may detect, in real time using a detection unit, whether current value of discharging current of the N battery modules included in the battery is greater than the safe discharging current isafe.

If the current value of the discharging current of the N battery modules included in the battery is greater than the safe discharging current isafe, the discharging currents of the battery may be adjusted.

If the current value of the discharging current of the N battery modules included in the battery is less than or equal to the safe discharging current isafe, the battery discharging state continues to be maintained.

609: The battery control apparatus adjusts the current value of the N battery modules.

When the battery control apparatus detects that a discharging current of at least one of the N battery modules in the battery is greater than the safe discharging current isafe, the battery control apparatus adjusts the discharging currents of the N battery modules such that the current value respectively corresponding to the N battery modules is equal to or less than the safe discharging current isafe.

In this embodiment, the battery control apparatus determines, by obtaining the target parameter after vehicle charging ends or battery charging is suspended, the target battery module that has the largest resistance difference of the parallel branch circuits corresponding to the battery cells in the same battery module, then obtains the safe discharging current corresponding to the target battery module, and control the discharging current of the battery module to be less than or equal to the safe discharging current, to ensure that the discharging current of the battery is in a safe state. Therefore, in this embodiment, in the discharging process of the battery, a discharging current of each battery cell in a battery module in a different SOC period is within a safe current range. This avoids battery overdischarging and improving discharging safety.

The foregoing describes the battery control method in the embodiments of this application. The following describes a battery control apparatus in the embodiments of this application with reference to the accompanying drawings.

Figure 7:
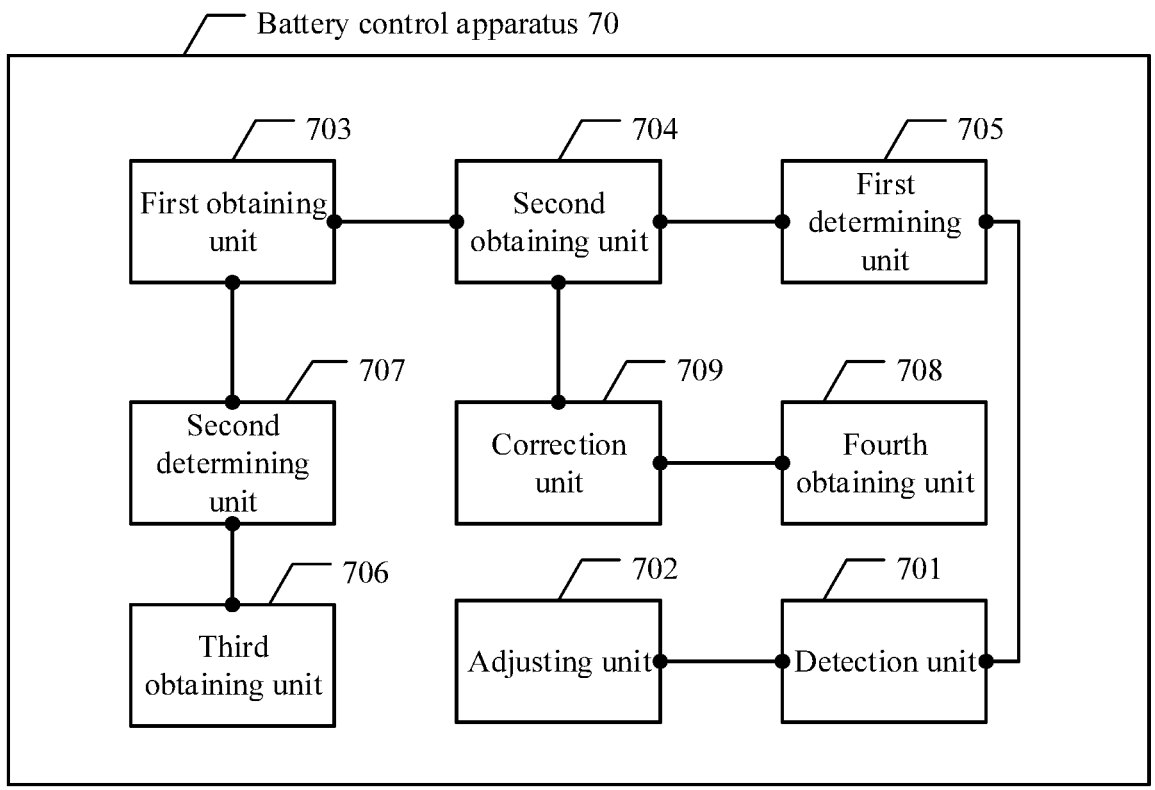
FIG. 7 is a schematic block diagram of a battery control apparatus according to an embodiment of this application.

FIG. 7 is a schematic block diagram of a battery control apparatus according to an embodiment of this application. The battery control apparatus 70 includes a detecting unit 701 configured to detect whether current value of the N battery modules is greater than a safe current, where the safe current is a safe current of a target battery module, and the target battery module is a battery module that has a largest resistance difference of parallel branch circuits respectively corresponding to the M battery cells in a same battery module, where the target battery module is included in the N battery modules, and an adjusting unit 702 configured to when a current value of at least one of the N battery modules is greater than the safe current, adjust the current value of the N battery modules such that the current value respectively corresponding to the N battery modules is equal to or less than the safe current.

Optionally, in this embodiment, the battery control apparatus 70 further includes a first obtaining unit 703 configured to obtain a resistance value of a first resistor, where the first resistor is a total resistor of the target battery module, a second obtaining unit 704 configured to obtain resistance values of second resistors, where the second resistors are resistors of the parallel branch circuits respectively corresponding to the M battery cells in the target battery module, and a first determining unit 705 configured to determine, based on the resistance value of the first resistor and the resistance values of the second resistors, the safe current corresponding to the target battery module.

Optionally, in this embodiment, the first obtaining unit 703 is further configured to obtain at least one group of first charging parameters, where the at least one group of first charging parameters are charging parameters collected at different moments when a charging current is not zero, each of the at least one group of first charging parameters include first terminal voltages, first currents, first temperatures, and first battery SOCs that are respectively corresponding to the N battery modules, and the first SOCs are SOCs respectively corresponding to the N battery modules when the group of first charging parameters are obtained, where the SOC is a ratio of a remaining capacity of the battery cell to a saturated capacity of the battery cell, determine, based on the at least one group of first charging parameters, resistance values respectively corresponding to the N battery modules, and determine, from the resistance values respectively corresponding to the N battery modules, that a resistance value corresponding to the target battery module is the resistance value of the first resistor.

Optionally, in this embodiment, the battery control apparatus 70 further includes a third obtaining unit 706 configured to obtain at least one group of second charging parameters, where the at least one group of second charging parameters are charging parameters collected at different moments when a charging current is zero, each of the at least one group of second charging parameters include second terminal voltages, second currents, second temperatures, and second SOCs that are respectively corresponding to the N battery modules, and the second SOCs are SOCs respectively corresponding to the N battery modules when the group of second charging parameters are obtained, and a second determining unit 707 configured to determine the target battery module based on the at least one group of second charging parameters.

Optionally, in this embodiment, the second obtaining unit 704 is further configured to obtain the resistance values of the second resistors based on the at least one group of second charging parameters and the resistance value of the first resistor.

Optionally, in this embodiment, the battery control apparatus 70 further includes a fourth obtaining unit 708 configured to obtain a first target SOC, where the first target SOC is an SOC corresponding to the first resistor when the charging current is zero, and a correction unit 709 configured to correct the second terminal voltage based on the first target SOC, to obtain at least one group of corrected second charging parameters, where correspondingly, the second obtaining unit 704 is further configured to obtain the resistance values of the second resistors based on the at least one group of corrected second charging parameters and the resistance value of the first resistor.

Optionally, in this embodiment, the first obtaining unit 703 is further configured to obtain at least one group of third charging parameters, where the at least one group of third charging parameters are charging parameters collected at different moments in a charging process, each of the at least one group of third charging parameters include third terminal voltages, third currents, third temperatures, and third SOCs that are respectively corresponding to the N battery modules, and the third SOCs are SOCs respectively corresponding to the N battery modules when the group of third charging parameters are obtained, determine, based on the at least one group of third charging parameters, resistance values respectively corresponding to the N battery modules, and determine, from the resistance values respectively corresponding to the N battery modules, that a resistance value corresponding to the target battery module is the resistance value of the first resistor.

Optionally, in this embodiment, the third obtaining unit 706 is further configured to obtain at least one group of target parameters, where the at least one group of target parameters are parameters collected at different moments after charging ends, each of the at least one group of target parameters include fourth terminal voltages, fourth currents, fourth temperatures, and fourth SOCs that are respectively corresponding to the N battery modules, and the fourth SOCs are SOCs respectively corresponding to the N battery modules when the group of target parameters are obtained, and the second determining unit 707 is configured to determine the target battery module based on the at least one group of target parameter.

Optionally, in this embodiment, the second obtaining unit 704 is further configured to obtain the resistance values of the second resistors based on the at least one group of target parameters and the resistance value of the first resistor.

Optionally, in this embodiment, the fourth obtaining unit 708 is further configured to obtain a second target SOC, where the second target SOC is an SOC corresponding to the first resistor when charging ends, and the correction unit 709 is configured to correct the fourth terminal voltage based on the second target SOC, to obtain at least one group of corrected target parameters, where correspondingly, the second obtaining unit 704 is further configured to obtain the resistance values of the second resistors based on the at least one group of corrected target parameters and the resistance value of the first resistor.

In the embodiments, when the detection unit 701 detects that a current that passes through the battery is greater than the safe current, the adjusting unit 702 adjusts the current that passes through the battery to the safe current, where the safe current is the safe current corresponding to the battery module that has the largest resistance difference of the parallel branch circuits respectively corresponding to the battery cells in the same battery module such that the charging current of each battery module in the battery module is less than or equal to the safe current in order to ensure that the current of each battery cell is within the safe current range. This avoids overcharging or overdischarging of the battery and improves charging safety.

Figure 8:
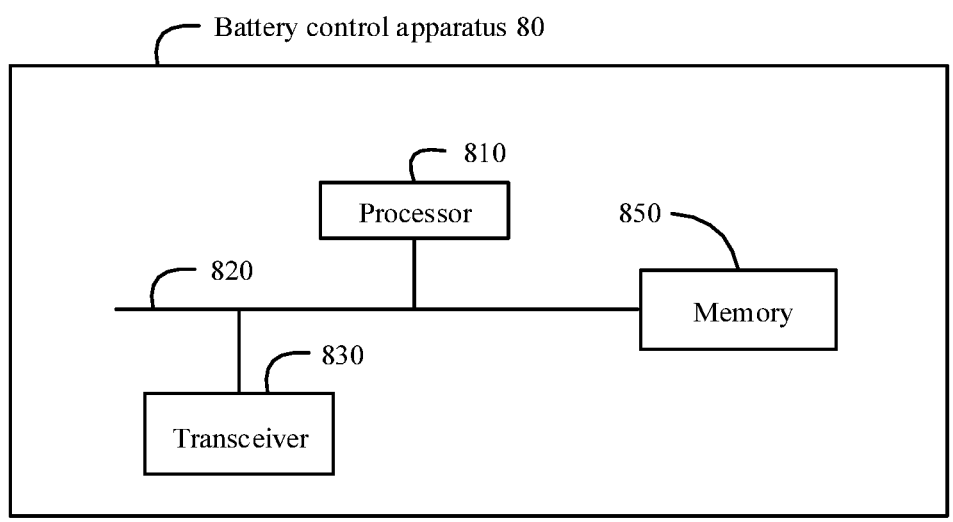
FIG. 8 is a schematic structural diagram of a battery control apparatus according to an embodiment of this application.

FIG. 8 is a schematic structural diagram of a battery control apparatus according to an embodiment of this application. The battery control apparatus 80 includes at least one processor 810, a memory 850, and a transceiver 830. The transceiver may include a receiver and a transmitter. The memory 850 may include a read-only memory and/or a random access memory, and provide an operation instruction and data for the processor 810. A part of the memory 850 may further include a non-volatile random-access memory (RAM) (NVRAM).

In some implementations, the memory 850 stores the following elements an executable module or a data structure, or a subset thereof, or an extended set thereof.

In this embodiment of this application, the operation instruction stored in the memory 850 (the operation instruction may be stored in an operating system) is invoked to perform a corresponding operation. The processor 810 controls an operation of the battery control apparatus 80, and the processor 810 may further be referred to as a central processing unit (CPU). The memory 850 may include a read-only memory (ROM) and a RAM, and provide an instruction and data for the processor 810. A part of the memory 850 may further include an NVRAM. During specific application, components of the battery control apparatus 80 are coupled together using a bus system 820. In addition to a data bus, the bus system 820 includes a power bus, a control bus, and a status signal bus. However, for clear description, various types of buses in the figure are marked as the bus system 820.

The methods disclosed in the foregoing embodiments of this application may be applied to a processor 810 or may be implemented by the processor 810. The processor 810 may be an integrated circuit chip and has a signal processing capability. In an implementation process, steps in the foregoing methods can be implemented using a hardware integrated logical circuit in the processor 810, or using instructions in a form of software. The processor 810 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. A software module may be located in a mature storage medium in the art, such as a RAM, a flash memory, a ROM, a programmable ROM (PROM), an electrically erasable PROM (EEPROM), or a register. The storage medium is located in the memory 850. The memory 850 may be a physically independent unit, or may be integrated into the processor 810. The processor 810 reads information from the memory 850, and completes the steps of the foregoing methods in combination with hardware of the processor 810.

The transceiver 830 in this embodiment may be configured to perform receiving and sending operation steps in the embodiment corresponding to FIG. 3 and the embodiment corresponding to FIG. 6, or steps of sending and receiving data of the battery control apparatus in another optional embodiment.

The processor 810 may be configured to perform data processing steps in the embodiment corresponding to FIG. 3 and the embodiment corresponding to FIG. 6, or data processing steps of the battery control apparatus in another optional embodiment.

Figure 9:
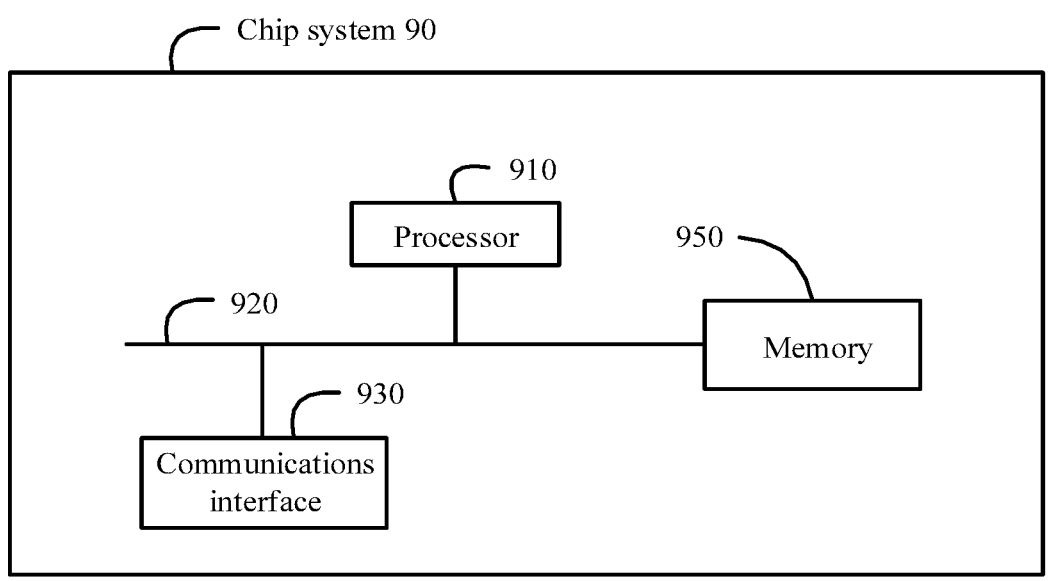
FIG. 9 is a schematic structural diagram of a chip system according to an embodiment of this application.

FIG. 9 is a schematic structural diagram of a chip system according to an embodiment of this application. A chip system 90 includes at least one processor 910, a memory 950, and a communications interface 930. The memory 950 may include a read-only memory and a random access memory, and provide an operation instruction and data for the processor 910. A part of the memory 950 may further include an NVRAM.

In some implementations, the memory 950 stores the following elements an executable module or a data structure, or a subset thereof, or an extended set thereof.

In this embodiment of this application, the operation instruction stored in the memory 950 (the operation instruction may be stored in an operating system) is invoked to perform a corresponding operation.

The processor 910 controls an operation of the chip system, and the processor 910 may further be referred to as a CPU. The memory 950 may include a ROM and a RAM, and provide an instruction and data for the processor 910. A part of the memory 950 may further include an NVRAM. In a specific application, components of the chip system 90 are coupled together using a bus system 920. In addition to a data bus, the bus system 920 includes a power bus, a control bus, and a status signal bus. However, for clear description, various types of buses in the figure are marked as the bus system 920.

The methods disclosed in the foregoing embodiments of this application may be applied to a processor 910 or may be implemented by the processor 910. The processor 910 may be an integrated circuit chip and has a signal processing capability. In an implementation process, steps in the foregoing methods can be implemented using a hardware integrated logical circuit in the processor 910, or using instructions in a form of software. The processor 910 may be a general-purpose processor, a DSP, an ASIC, an FPGA or another programmable logic device, a discrete gate or a transistor logic device, or a discrete hardware component. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. A software module may be located in a mature storage medium in the art, such as a RAM, a flash memory, a ROM, a PROM, an EEPROM, or a register. The storage medium is located in the memory 950. The memory 950 may be a physically independent unit, or may be integrated into the processor 910. The processor 910 reads information from the memory 950, and completes the steps of the foregoing methods in combination with hardware of the processor 910.

The communications interface 930 in this embodiment may be configured to perform receiving and sending operation steps in the embodiment corresponding to FIG. 3 and the embodiment corresponding to FIG. 6, or steps of sending and receiving data of the battery control apparatus in another optional embodiment.

The processor 910 may be configured to perform data processing steps in the embodiment corresponding to FIG. 3 and the embodiment corresponding to FIG. 6, or data processing steps of the battery control apparatus in another optional embodiment.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

Persons of ordinary skill in the art may understand that all or some of the steps of the methods in the embodiments may be implemented by a program instructing relevant hardware. The program may be stored in a computer-readable storage medium. The storage medium may include a ROM, a RAM, a magnetic disk, or an optical disc, or the like.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "have", or any other variant thereof are intended to cover non-exclusive inclusion. The naming or numbering of the steps appearing in this application does not mean that the steps in the method procedures need to be performed in a time/logical order indicated by the naming or numbering. An execution order of the steps in the procedures that have been named or numbered can be changed according to the technical objective to be achieved, as long as same or similar technical effects can be achieved.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method comprising:
    obtaining a first resistance value of a total resistance of a target battery system of N battery systems of a battery based on a group of first charging parameters collected at first different moments when a charging current is not zero, wherein the group of first charging parameters comprises first terminal voltages, first currents, first temperatures, and first battery state of charges (SOCs) that are respectively corresponding to the N battery systems;
    obtaining second resistance values of parallel branch circuits;
    obtaining a safe current based on the first resistance value and the second resistance values;
    detecting whether a current value of each of the N battery systems is greater than the safe current, wherein the N battery systems are coupled in series, wherein each of the N battery systems comprises M battery cells, wherein the M battery cells are coupled in parallel, wherein N is an integer greater than or equal to one, wherein M is an integer greater than one, wherein the safe current is a current of the target battery system, and wherein the target battery system has a largest resistance difference of the parallel branch circuits respectively corresponding to the M battery cells in the target battery system; and
    adjusting the current value of each of the N battery systems when the current value is greater than the safe current such that current values respectively corresponding to the N battery systems are equal to or less than the safe current.

2. The method of claim 1, wherein an SOC is a ratio of a remaining capacity of a battery cell to a saturated capacity of the battery cell, and wherein obtaining the first resistance value when the safe current is a safe charging current comprises:
    obtaining, based on the group of first charging parameters, third resistance values respectively corresponding to the N battery systems; and
    obtaining, from the third resistance values, a fourth resistance value corresponding to the target battery system as the first resistance value.

3. The method of claim 2, wherein before obtaining the fourth resistance value as the first resistance value, the method further comprises:
    obtaining a group of second charging parameters collected at second different moments when the charging current is zero, wherein the group of second charging parameters comprises second terminal voltages, second currents, second temperatures, and second SOCs that are respectively corresponding to the N battery systems when obtaining the group of second charging parameters; and
    obtaining the target battery system based on the group of second charging parameters.

4. The method of claim 3, further comprising obtaining the second resistance values based on the group of second charging parameters and the first resistance value.

5. The method of claim 4, wherein before obtaining the second resistance values, the method further comprises:
    obtaining a first target SOC corresponding to the total resistance of the target battery system when the charging current is zero;
    correcting the second terminal voltages based on the first target SOC to obtain a group of corrected second charging parameters; and
    obtaining the second resistance values based on the group of corrected second charging parameters and the first resistance value.

6. The method of claim 1, wherein obtaining the first resistance value when the safe current is a safe discharging current comprises:
    obtaining a group of third charging parameters collected at third different moments in a charging process, wherein the group of third charging parameters comprises third terminal voltages, third currents, third temperatures, and third SOCs that are respectively corresponding to the N battery systems when obtaining the group of third charging parameters;
    obtaining, based on the group of third charging parameters, fifth resistance values respectively corresponding to the N battery systems; and obtaining, from the fifth resistance values, a sixth resistance value corresponding to the target battery system as the first resistance value.

7. The method of claim 6, wherein before obtaining the sixth resistance value as the first resistance value, the method further comprises:
obtaining a group of target parameters collected at fourth different moments after charging ends, wherein the group of target parameters comprise fourth terminal voltages, fourth currents, fourth temperatures, and fourth SOCs that are respectively corresponding to the N battery systems when obtaining the group of target parameters; and
obtaining the target battery system based on the group of target parameters.

8. The method of claim 7, further comprising obtaining the second resistance values based on the group of target parameters and the first resistance value.

9. The method of claim 8, wherein before obtaining the second resistance values, the method further comprises:
obtaining a second target SOC corresponding to the total resistance of the target battery system when charging ends;
correcting the fourth terminal voltages based on the second target SOC to obtain a group of corrected target parameters; and
obtaining the second resistance values based on the group of corrected target parameters and the first resistance value.

10. A battery control apparatus applied to a battery comprising N battery systems, wherein the battery control apparatus comprises:
a non-transitory computer-readable storage medium configured to store programming instructions; and
a processor coupled to the non-transitory computer-readable storage medium, wherein the programming instructions cause the processor to be configured to:
obtain a first resistance value of a total resistance of a target battery system of the N battery systems based on a group of first charging parameters collected at first different moments when a charging current is not zero, wherein the group of first charging parameters comprises first terminal voltages, first currents, first temperatures, and first battery state of charges (SOCs) that are respectively corresponding to the N battery systems;
obtain second resistance values of parallel branch circuits;
obtain a safe current based on the first resistance value and the second resistance values;
detect whether a current value of each of the N battery systems of a battery is greater than the safe current, wherein the N battery systems are coupled in series, wherein each of the N battery systems comprises M battery cells, wherein the M battery cells are coupled in parallel, wherein N is an integer greater than or equal to one, wherein M is an integer greater than one, wherein the safe current is a current of the target battery system, and wherein the target battery system has a largest resistance difference of the parallel branch circuits respectively corresponding to the M battery cells in the target battery system; and
adjust the current value of each of the N battery systems when the current value is greater than the safe current such that current values respectively corresponding to the N battery systems are equal to or less than the safe current.

11. The battery control apparatus of claim 10, wherein an SOC is a ratio of a remaining capacity of a battery cell to a saturated capacity of the battery cell, and wherein the programming instructions further cause the processor to be configured to:
obtain, based on the group of first charging parameters, third resistance values respectively corresponding to the N battery systems; and
obtain, from the third resistance values, a fourth resistance value corresponding to the target battery system as the first resistance value.

12. The battery control apparatus of claim 11, wherein the programming instructions further cause the processor to be configured to:
obtain a group of second charging parameters collected at second different moments when the charging current is zero, wherein the group of second charging parameters comprises second terminal voltages, second currents, second temperatures, and second SOCs that are respectively corresponding to the N battery systems when obtaining the group of second charging parameters; and
obtain the target battery system based on the group of second charging parameters.

13. The battery control apparatus of claim 12, wherein the programming instructions further cause the processor to be configured to obtain the second resistance values based on the group of second charging parameters and the first resistance value.

14. The battery control apparatus of claim 13, wherein the programming instructions further cause the processor to be configured to:
obtain a first target SOC corresponding to the total resistance of the target battery system when the charging current is zero;
correct the second terminal voltages based on the first target SOC to obtain a group of corrected second charging parameters; and
obtain the second resistance values based on the group of corrected second charging parameters and the first resistance value.

15. The battery control apparatus of claim 10, wherein the programming instructions further cause the processor to be configured to:
obtain a group of third charging parameters collected at third different moments in a charging process, wherein the group of third charging parameters comprises third terminal voltages, third currents, third temperatures, and third SOCs that are respectively corresponding to the N battery systems when obtaining the group of third charging parameters;
obtain, based on the group of third charging parameters, fourth resistance values respectively corresponding to the N battery systems; and
obtain, from the fourth resistance values, a fifth resistance value corresponding to the target battery system as the first resistance value.

16. The battery control apparatus of claim 15, wherein the programming instructions further cause the processor to be configured to:
obtain a group of target parameters collected at fourth different moments after charging ends, wherein the group of target parameters comprise fourth terminal voltages, fourth currents, fourth temperatures, and fourth SOCs that are respectively corresponding to the N battery systems when obtaining the group of target parameters; and obtain the target battery system based on the group of target parameter.

17. The battery control apparatus of claim 16, wherein the programming instructions further cause the processor to be configured to obtain the second resistance values based on the group of target parameters and the first resistance value.

18. The battery control apparatus of claim 17, wherein the programming instructions further cause the processor to be configured to:
  obtain a second target SOC corresponding to the total resistance of the target battery system when charging ends;
  correct the fourth terminal voltages based on the second target SOC to obtain a group of corrected target parameters; and
  obtain the second resistance values based on the group of corrected target parameters and the first resistance value.

19. A computer program product comprising computer-executable instructions that are stored on a non-transitory computer-readable medium and that, when executed by a processor, cause a battery control apparatus to:
  obtain a first resistance value of a total resistance of a target battery system of N battery systems of a battery based on a group of first charging parameters collected at first different moments when a charging current is not zero, wherein the group of first charging parameters comprises first terminal voltages, first currents, first temperatures, and first battery state of charges (SOCs) that are respectively corresponding to the N battery systems;
  obtain second resistance values of parallel branch circuits;
  obtain a safe current based on the first resistance value and the second resistance values;
  detect whether a current value of each of the N battery systems is greater than the safe current, wherein the N battery systems are coupled in series, wherein each of the N battery systems comprises M battery cells, wherein the M battery cells are coupled in parallel, wherein N is an integer greater than or equal to one, wherein M is an integer greater than one, wherein the safe current is a current of the target battery system, and wherein the target battery system has a largest resistance difference of the parallel branch circuits respectively corresponding to the M battery cells in the target battery system; and
  adjust the current value of each of the N battery systems when the current value is greater than the safe current such that current values respectively corresponding to the N battery systems are equal to or less than the safe current.

20. The computer program product of claim 19, wherein an SOC is a ratio of a remaining capacity of a battery cell to a saturated capacity of the battery cell.

* * * * *

UNITED STATES PATENT AND TRADEMARK OFFICE
CERTIFICATE OF CORRECTION

| | | |
|---|---|---|
| PATENT NO. | : 12,155,243 B2 | Page 1 of 1 |
| APPLICATION NO. | : 17/010067 | |
| DATED | : November 26, 2024 | |
| INVENTOR(S) | : Lulu Zheng et al. | |

It is certified that error appears in the above-identified patent and that said Letters Patent is hereby corrected as shown below:

In the Claims

Column 25 Line 52 Claim 10:
"systems of a battery is greater than the safe current," should read "systems is greater than the safe current,".

Signed and Sealed this
Thirty-first Day of December, 2024

Derrick Brent
*Acting Director of the United States Patent and Trademark Office*